(12) United States Patent
Yokota

(10) Patent No.: US 8,432,499 B2
(45) Date of Patent: Apr. 30, 2013

(54) DISPLAY DEVICE AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/377,234

(22) PCT Filed: Apr. 21, 2010

(86) PCT No.: PCT/JP2010/057041
§ 371 (c)(1),
(2), (4) Date: Dec. 9, 2011

(87) PCT Pub. No.: WO2010/146933
PCT Pub. Date: Dec. 23, 2010

(65) Prior Publication Data
US 2012/0086876 A1 Apr. 12, 2012

(30) Foreign Application Priority Data
Jun. 17, 2009 (JP) ................................. 2009-144314

(51) Int. Cl.
*H04N 5/44* (2006.01)
*G02F 1/13357* (2006.01)

(52) U.S. Cl.
USPC .......................................... 348/794; 362/97.1

(58) Field of Classification Search .................. 348/794, 348/790, 792, 725, 779, 836; 362/97.1, 97.4, 362/561, 294
See application file for complete search history.

(56) References Cited

U.S. PATENT DOCUMENTS 7,056,002 B2 * 6/2006 Kang et al. ..................... 362/561
7,121,710 B2 * 10/2006 Kim et al. ....................... 362/632

(Continued)

FOREIGN PATENT DOCUMENTS

JP 2005-331957 A 12/2005
JP 2006-308790 A 11/2006

(Continued)

OTHER PUBLICATIONS

Official Communication issued in International Patent Application No. PCT/JP2010/057041, mailed on Jun. 29, 2010.

(Continued)

*Primary Examiner* — Paulos M Natnael
(74) *Attorney, Agent, or Firm* — Keating & Bennett, LLP

(57) ABSTRACT

The present invention provides a display device that can be provided as a final product such as a television receiver simply by assembling a display panel and a backlight and is excellent in workability in assembling the display panel to the backlight while securing a wide effective display region. The display device according to the present invention includes an LED 52, an LED board 51 on which the LED 52 is mounted, a liquid crystal panel 11, a first cabinet Ca, a second cabinet Cb, and a reflection sheet 60. The liquid crystal panel 11 is configured to provide display using light from the LED 52. The liquid crystal panel 11 is attached to the first cabinet Ca. The LED board 51 is attached to the second cabinet Cb. The reflection sheet 60 is configured to reflect the light from the LED 52. The first cabinet Ca and the second cabinet Cb are engaged with each other and configured as an outer case that forms an exterior of a liquid crystal display device 10. The reflection sheet 60 is arranged on the inner surface of the second cabinet Cb in a state in which the reflection sheet 60 is supported by the LED board 51.

19 Claims, 11 Drawing Sheets

U.S. PATENT DOCUMENTS

| | | |
|---|---|---|
| 7,319,498 B2 * | 1/2008 | Sakurai et al. .................. 349/58 |
| 7,324,174 B2 | 1/2008 | Hafuka et al. |
| 7,538,833 B2 | 5/2009 | Azuma et al. |
| 7,583,353 B2 * | 9/2009 | Kujiraoka ..................... 349/187 |
| 7,999,884 B2 * | 8/2011 | Na et al. ......................... 349/58 |
| 8,267,536 B2 * | 9/2012 | Hayashi ....................... 362/97.1 |
| 2005/0259192 A1 | 11/2005 | Lee |
| 2006/0244891 A1 | 11/2006 | Tsubokura et al. |
| 2008/0030653 A1 | 2/2008 | Lee et al. |
| 2009/0128528 A1 * | 5/2009 | Takata .......................... 345/206 |
| 2009/0147173 A1 | 6/2009 | An et al. |
| 2010/0238359 A1 * | 9/2010 | Kuromizu .................... 348/725 |
| 2010/0321926 A1 * | 12/2010 | Takeba ........................ 362/97.2 |
| 2010/0328572 A1 * | 12/2010 | Takeba ........................... 349/61 |

FOREIGN PATENT DOCUMENTS

| | | |
|---|---|---|
| JP | 2008-152101 A | 7/2008 |
| JP | 2008-293711 A | 12/2008 |

OTHER PUBLICATIONS

Yokota, "Display Device and Television Receiver", U.S. Appl. No. 13/377,233, filed Dec. 9, 2011.

Yokota, "Lighting Device, Display Device, Television Receiver", U.S. Appl. No. 13/377,235, filed Dec. 9, 2011.

Yokota, "Display Device and Television Receiver", U.S. Appl. No. 13/377,238, filed Dec. 9, 2011.

* cited by examiner

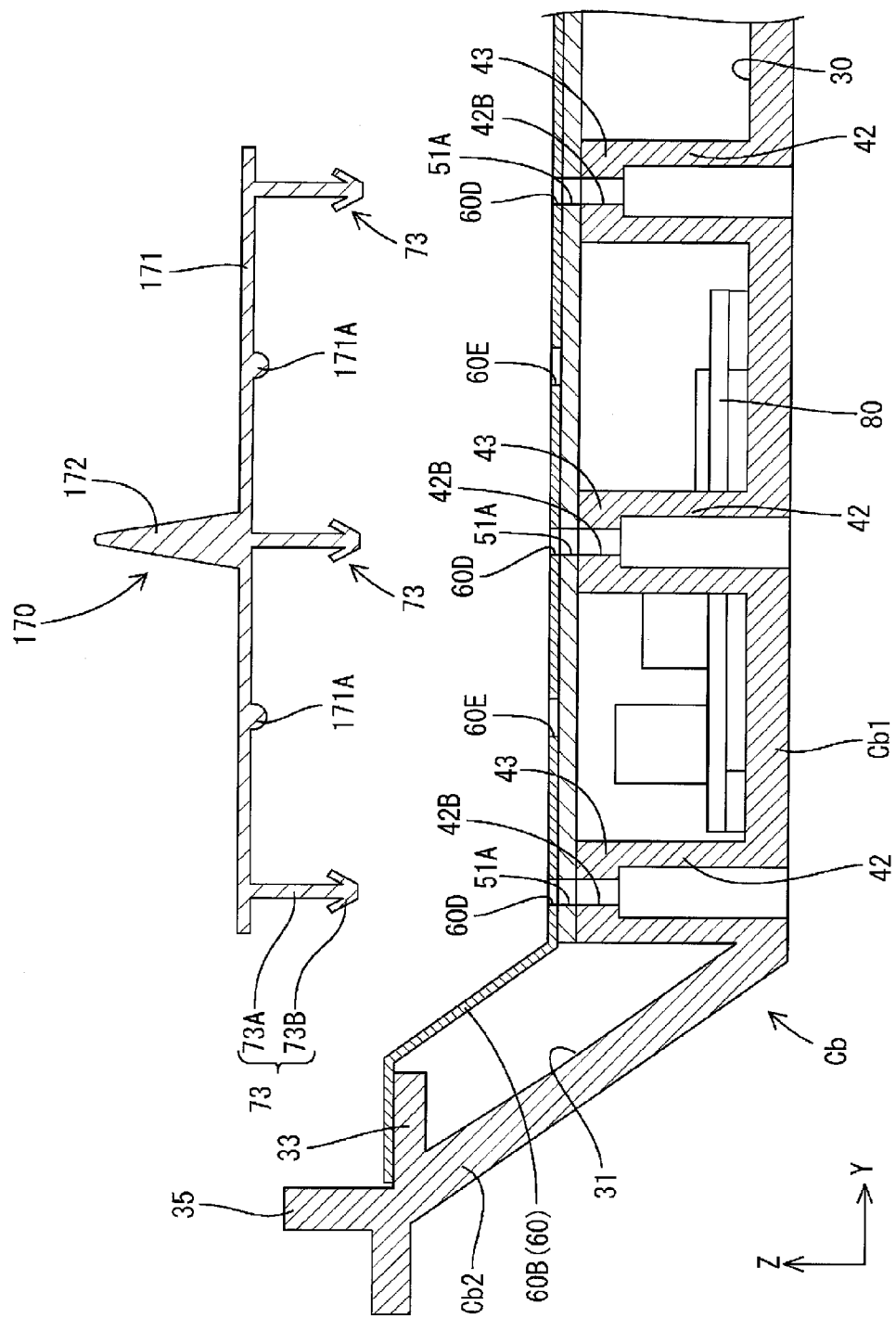

DISPLAY DEVICE AND TELEVISION RECEIVER

TECHNICAL FIELD

The present invention relates to a display device and a television receiver.

BACKGROUND ART

For example, a liquid crystal panel used for a liquid crystal display device such as a liquid crystal television does not spontaneously emit light. Therefore, a backlight is separately required as an illumination device. A liquid crystal display device described in Patent Literature 1 has a configuration in which a backlight includes a chassis that houses plural cold-cathode tubes and a frame for aligning an optical member in the chassis and the backlight and a liquid crystal panel are maintained in an assembled state by a bezel that covers the liquid crystal panel from the front side. The liquid crystal display device is held between both front and rear cabinets, which are exterior components, to configure a television receiver. In other words, as clearly indicated in Patent Literature 1, the liquid crystal panel and the backlight are separately manufactured and assembled with each other using the bezel or the like to manufacture the liquid crystal display device. The liquid crystal display device is held between a pair of cabinets to manufacture a television receiver.

PRIOR ART DOCUMENT

Patent Document

Patent Document 1: Japanese Unexamined Patent Application Publication No. 2008-293711

PROBLEM TO BE SOLVED BY THE INVENTION

In the technique of Patent Literature 1, the liquid crystal panel and the backlight are separately manufactured, assembled in a separate process, and housed in the cabinets in another separate process to configure the television receiver. However, such a method is not always an efficient method because the number of processes increases. In the technique of Patent Literature 1, the liquid crystal panel is assembled to the backlight by the bezel. However, for example, when the liquid crystal panel is directly placed on the backlight and then assembled by the bezel, if a portion where the liquid crystal panel is placed is secured wide, an effective display region of the liquid crystal panel is reduced. Therefore, it is necessary to secure the placing portion narrow. However, placing the liquid crystal panel in the narrow portion has a problem in that workability is low compared with placing the liquid crystal panel in the wide portion.

DISCLOSURE OF THE PRESENT INVENTION

The present invention has been devised in view of the above problems and it is an object of the present invention to provide a display device that can be provided as a final product such as a television receiver simply by assembling a display panel and a backlight and is excellent in workability in assembling the display panel to the backlight while securing a wide effective display region. It is also an object of the present invention to provide a television receiver including such a display device.

MEANS FOR SOLVING THE PROBLEM

In order to solve the problems, a display device according to the present invention includes a light source, a board on which the light source is mounted, a display panel, a first cabinet, a second cabinet, and a reflection sheet. The display panel is configured to provide display using light from the light source. The display panel is attached to the first cabinet. The board is attached to the second cabinet. The reflection sheet is configured to reflect the light from the light source. The first cabinet and the second cabinet are engaged with each other. The first cabinet and the second cabinet are configured as an outer case that forms an exterior of the display device. The reflection sheet is arranged on the inner surface of the second cabinet in a state in which the reflection sheet is supported by the board.

According to the configuration explained above, the display panel is attached to the first cabinet and the light source is attached to the second cabinet. Therefore, a display function of the display panel using the light from the light source can be implemented by engaging the cabinets. The first cabinet and the second cabinet configure the outer case that forms the exterior of the display device. Therefore, it is possible to provide the display device as a final product such as a television receiver simply by engaging the first cabinet and the second cabinet.

In particular, in the present invention, since an attachment member such as a bezel is not used, material cost can be reduced. The number of assembly processes is reduced compared with the number of assembly processes for assembling the display panel and the backlight and then housing the display panel and the backlight in a separate cabinet to provide a final product such as a television receiver. In this regard, it is also possible to reduce the cost. The display panel and the backlight can be aligned by assembling of the first cabinet and the second cabinet. Therefore, workability of the alignment is improved. It is unnecessary to secure a region for alignment in the display panel. Therefore, it is possible to easily perform the alignment without involving a situation in which an effective display region of the display panel is reduced.

Incidentally, the second cabinet is a member to which components such as the board are attached. Therefore, irregularities (e.g., holes for component attachment and wall sections for component alignment) tend to be formed. If the reflection sheet is attached to a surface on which the irregularities are formed, in some cases, the reflection sheet may be bent or lifted. This may cause luminance unevenness. Therefore, in the present invention, as in the configuration explained above, the reflection sheet is supported by the board. This is because, in the board formed in a plate shape, irregularities on the surface are hardly formed and occurrence of a bend and a lift that occur when the reflection sheet is supported can be suppressed. It is unnecessary to provide an exclusive member for supporting the reflection sheet. In this regard, it is also possible to reduce the cost.

BRIEF DESCRIPTION OF THE DRAWINGS

FIG. 11 is a schematic view showing a state in which a holding member is attached to a second cabinet.

MODE FOR CARRYING OUT THE INVENTION

First Embodiment

Figure 1:
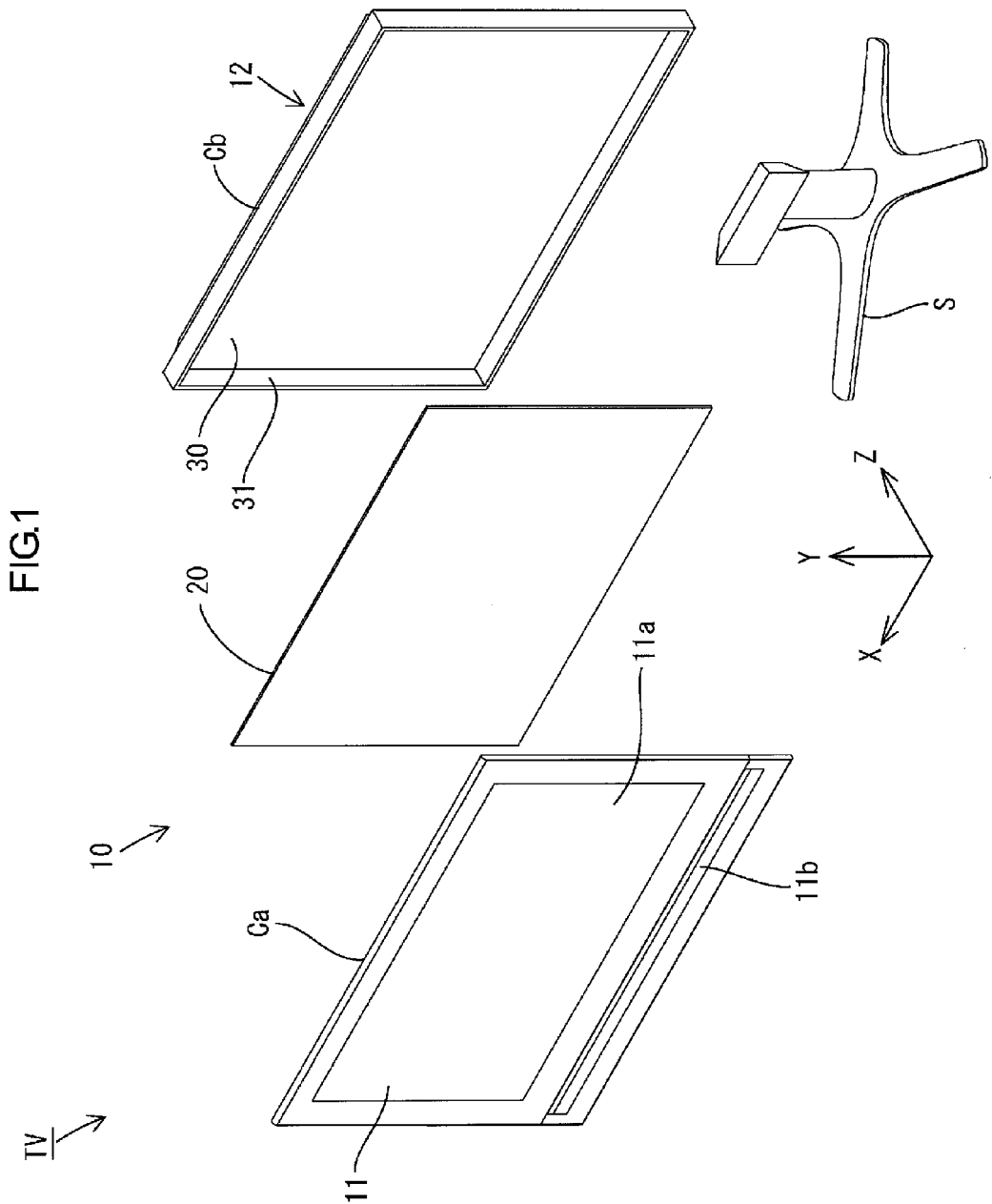
FIG. 1 is a disassembled perspective view showing a schematic configuration of a television receiver according to a first embodiment of the present invention.
Figure 2:
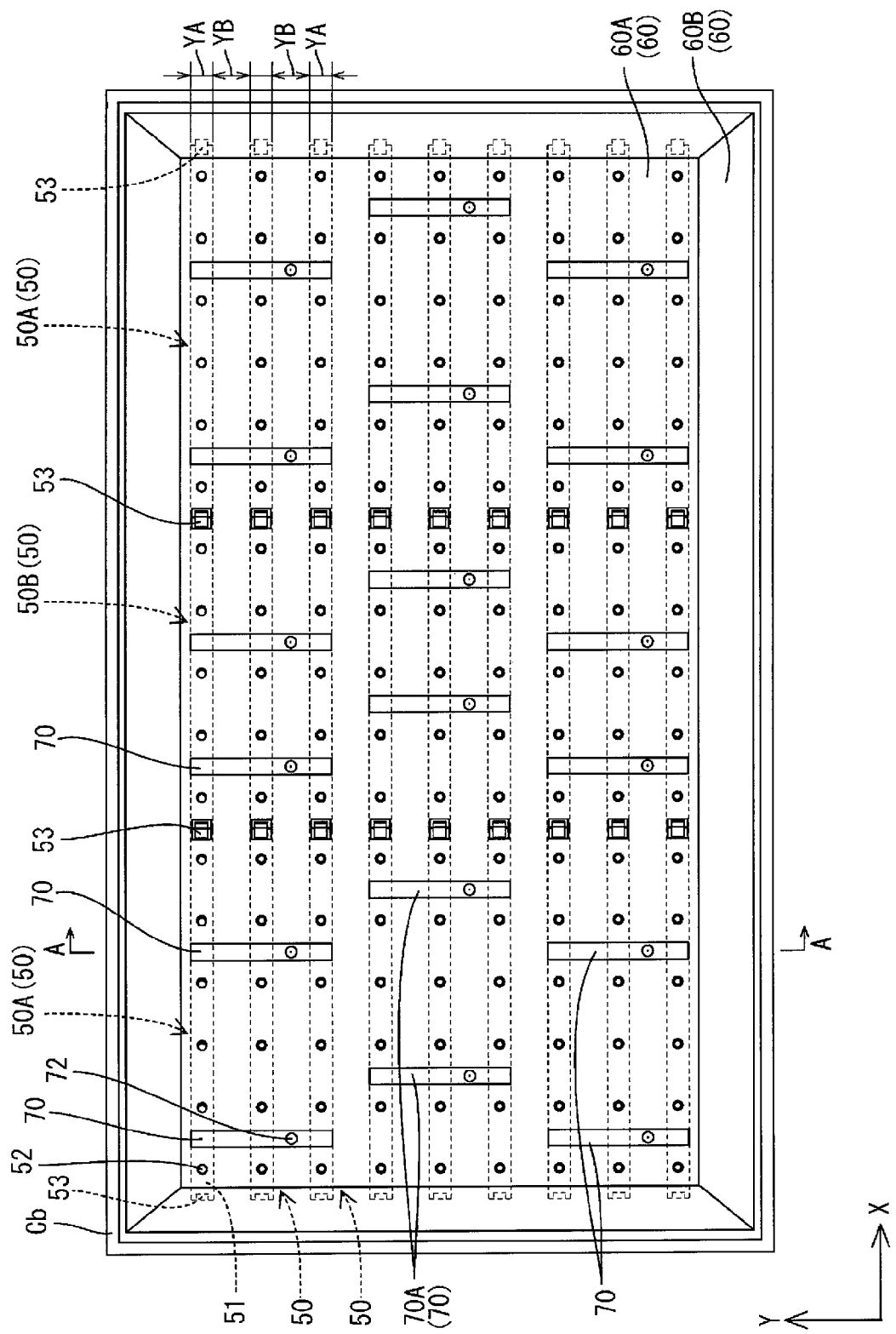
FIG. 2 is a plan view showing a backlight device.
Figure 3:
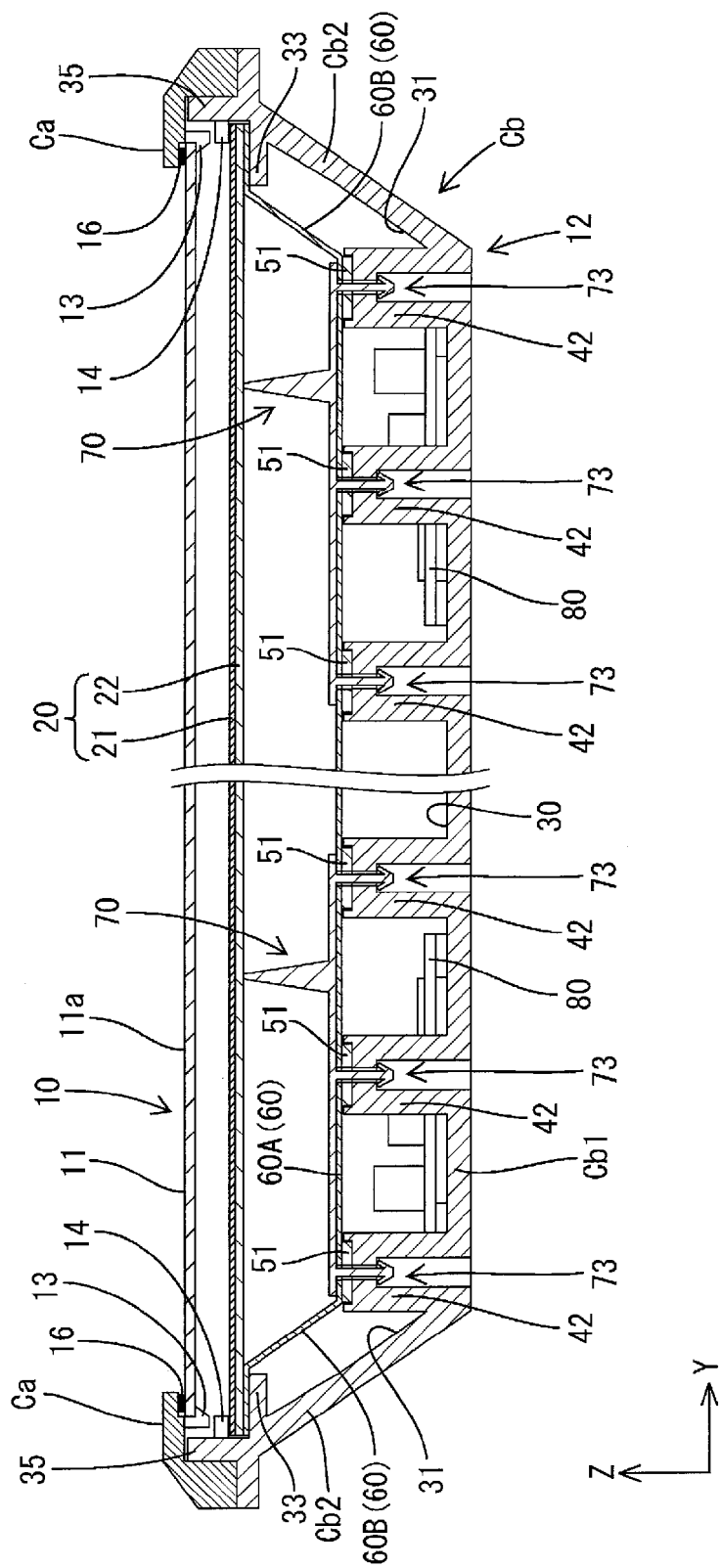
FIG. 3 is a sectional schematic view showing a state in which a liquid crystal display device is taken along a short side direction.

A first embodiment embodying the present invention is explained with reference to FIGS. 1 to 7. In this embodiment, an X axis, a Y axis, and a Z axis are shown in a part of the drawings. Axis directions are drawn to be directions shown in the drawings. An upper side shown in FIG. 3 is set as a front side and a lower side in the figure is set as a rear side. A television receiver TV according to this embodiment shown in FIG. 1 includes a liquid crystal display device 10, a stand S for placing the liquid crystal display device 10, a not-shown power supply, and a not-shown tuner.

The liquid crystal display device (a display device) 10 is formed in a square shape long in sideways as a whole and supported by the stand S such that a display surface extends along the vertical direction (the Y axis direction). The liquid crystal display device 10 includes a backlight device 12 (an illuminating device), which is an external light source, a liquid crystal panel 11 (a display panel) that performs display using light from the backlight device 12, and a first cabinet Ca to which the liquid crystal panel 11 can be attached.

The backlight device 12 includes a light source unit 50 configured by mounting plural LEDs 52 (light sources) on an LED board 51, a circuit board 80, and a second cabinet Cb to which the light source unit 50 and the circuit board 80 can be attached. The external shapes of the first cabinet Ca and the second cabinet Cb are formed in substantially the same sizes in plan view. The first cabinet Ca and the second cabinet Cb are engaged to configure an outer case forming an exterior of the liquid crystal display device 10.

The first cabinet Ca is formed of a frame-like synthetic resin member. The liquid crystal panel 11 is attached to the first cabinet Ca to be housed in the frame. A display surface 11a of the liquid crystal panel 11 is arranged in the frame. A speaker 11b and the like are provided on the surface side of the first cabinet Ca. On the other hand, the second cabinet Cb is formed of a box-like synthetic resin member having an opening on the front side and includes a bottom surface 30 that forms a box bottom and a wall section 31 vertically provided from the bottom surface 30 as shown in FIG. 3.

Specifically, the second cabinet Cb is attached on the opposite side of the display surface 11a of the liquid crystal panel 11 with respect to the first cabinet Ca and light is supplied from the LEDs 52 of the second cabinet Cb to the liquid crystal panel 11. An optical sheet 20 is arranged between the first cabinet Ca and the second cabinet Cb, specifically, between the liquid crystal panel 11 and the LEDs 52 and diffuses the light from the LEDs 52 in a planar shape.

The liquid crystal panel 11 is formed in a square shape long in sideways in plan view and has a configuration in which a pair of glass boards are bonded with a predetermined gap apart from each other and liquid crystal is filled between the glass boards. On one glass board, a switching element (e.g., TFT) connected to a source wire and a gate wire orthogonal to each other, a pixel electrode connected to the switching element, an oriented film, and the like are provided. On the other glass board, a color filter on which colored sections of R (red), G (green), B (blue), and the like are arranged in a predetermined array, a counter electrode, an oriented film, and the like are provided. Sheet polarizers are arranged on the outer sides of both the glass boards.

As shown in FIG. 3, the optical sheet 20 is configured by placing, one on top of the other, a diffuser 22 having large thickness arranged on the second cabinet Cb side and sheets 21 (a diffusing lens, a reflective polarizing sheet, etc.) having small thickness arranged on the first cabinet Ca side. The diffuser 22 is configured by dispersing light scattering particles in a tabular member made of synthetic resin and has a function of diffusing the light emitting from the LEDs 52, which are light sources.

Figure 6:
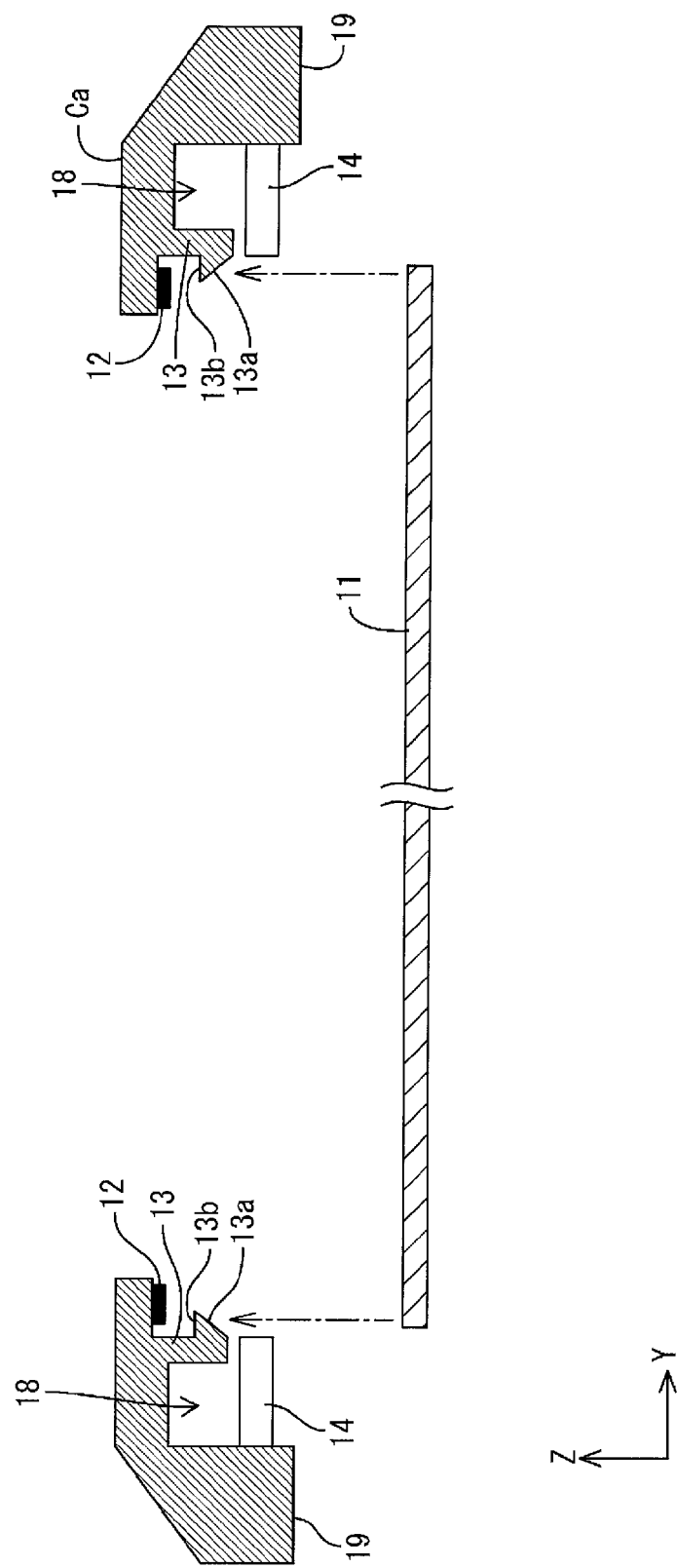
FIG. 6 is a schematic view showing a state in which a liquid crystal panel is attached to a first cabinet in the first embodiment.

Next, the configuration of the first cabinet Ca is explained. As shown in FIG. 3, the first cabinet Ca includes a claw section 13 for locking the liquid crystal panel 11. As shown in FIG. 6, the claw section 13 includes a locking surface 13b. The claw section 13 holds the peripheral edge of the liquid crystal panel 11 between the locking surface 13b and an elastic member 16 (such as PORON®) arranged to be opposed to the locking surface 13b. The claw section 13 itself is elastically deformable. The claw section 13 is configured to be elastically deformed in a direction in which the claw section 13 widens (to the outer side) when the liquid crystal panel 11 is attached to the first cabinet Ca and elastically returns in a direction in which the liquid crystal panel 11 is tightened (to the inner side) after the liquid crystal panel 11 is attached.

A slope 13a is provided in the claw section 13 of the first cabinet Ca to make it possible to, while guiding the liquid crystal panel 11 in a pressing direction (an arrow direction in FIG. 6), elastically deform the claw section 13 according to the pressing when the liquid crystal panel 11 is housed in the locking surface 13b of the claw section 13. On the rear side of the claw section 13, i.e., on the opposite side of a side where the liquid crystal panel 11 is locked, a projection housing section 18 for housing a projection 35 of the second cabinet Cb explained later is formed. A piece for holding 14 for holding the optical sheet 20 is formed in the first cabinet Ca.

Next, the configuration of the second cabinet Cb is explained. The second cabinet Cb is formed in a square shape long in sideways in plan view and is formed of a synthetic resin member. As shown in FIG. 3, the second cabinet Cb includes a bottom plate Cb1 that forms the bottom surface 30 and a wall plate Cb2 that forms the wall section 31. The wall section 31 tilts to be oriented to the inner side at a predetermined angle with respect to the bottom surface 30.

The light source unit 50 includes the plural LEDs 52 (Light Emitting Diodes), which are the light sources, and the LED board 51 on which the plural LEDs 52 are linearly mounted. In this embodiment, the backlight device 12 includes two kinds of the light source units 50 having different numbers of the LEDs 52 and different lengths in the X axis direction. Specifically, as shown in FIG. 2, the backlight device 12 includes the light source unit 50 (hereinafter referred to as light source unit 50A) on which six LEDs 52 are mounted and the light source unit 50 (hereinafter referred to as light source unit 50B) on which five LEDs 52 are mounted.

The light source unit 50A, the light source unit 50B, and the light source unit 50A are coupled in the X axis direction in this order to linearly array plural (in this embodiment, seventeen in total) LEDs 52 in the X axis direction on the second cabinet Cb. The light source units 50 arranged in the X axis direction are electrically connected via connectors 53 mounted on LED boards 51. The coupled light source units 50A and 50B are arrayed in plural rows (in this embodiment, nine rows) in the short side direction of the second cabinet Cb (the Y axis direction) at a fixed space apart from each other. Consequently, the plural LEDs 52 are two-dimensionally arrayed on the second cabinet Cb.

If the two kinds of the light source units 50A and 50B are combined to arrange the LEDs 52 as explained above, it is possible to cope with liquid crystal display devices 10 and backlight devices 12 having different screen sizes by changing the combination of the light source units 50A and 50B. Consequently, it is unnecessary to prepare LED boards having lengths corresponding to sizes of the liquid crystal display devices 10 (or the backlight devices 12) (by the number of kinds of the sizes) and it is possible to reduce the types of the LED boards and reduce cost. Since the light source unit 50A and the light source unit 50B have the same configuration except the number of mounted LEDs 52, only the light source unit 50A is explained below.

The LED board 51 is formed in a rectangular shape long in one direction in plan view. The plural LEDs 52 are mounted on the LED board 51 at an equal interval along a longitudinal direction of the LED board 51. In the LED 52, for example, an LED chip that emits light of a single color blue and a fluorescent material are combined to emit white light. The LEDs 52 are electrically connected to a control unit on the circuit board 80 explained later and configured to receive the supply of driving power. The back surface in the LED 52 is soldered to a land (not shown) on the LED board 51.

The LED board 51 is supported by board supporting section 42 formed by projecting a part of the bottom plate Cb1 to the front side (the reflection sheet 60 side). The board supporting section 42 is formed in a square shape in plan view and arranged in plural places (places where projection pieces 73 of a holding member 70 explained later are arranged) in both the X axis and Y axis directions. The LED board 51 is set such that a longitudinal direction thereof extends over plural board supporting sections 42 along the X axis direction. The board supporting section 42 is dent to the rear side to form a board attachment groove 42A. The board attachment groove 42A is formed along the X axis direction. The width of the board attachment groove 42A in the Y axis direction is set substantially the same as the width of the LED board 51. The LED boards 51 are fit in board attachment grooves 42A and aligned in the Y axis direction.

Figure 7:
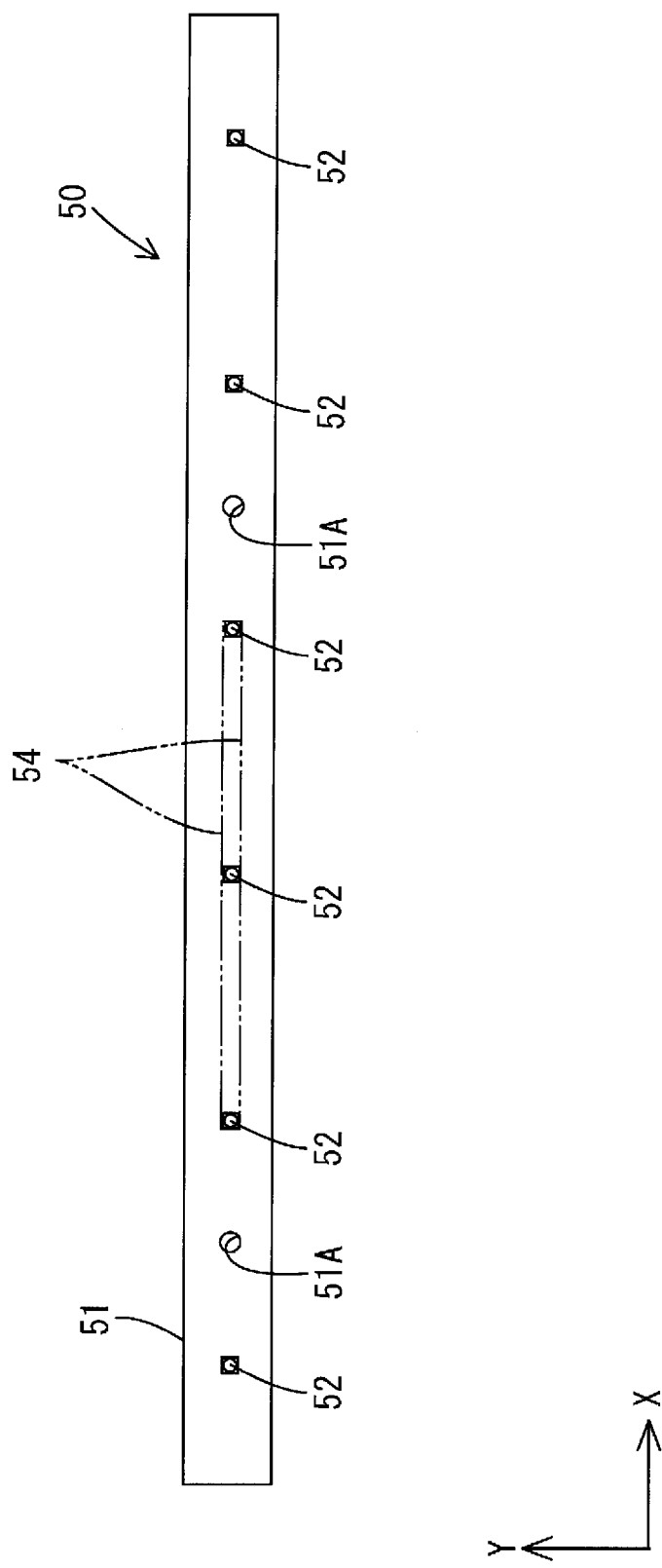
FIG. 7 is a plan view showing a light source unit.

As shown in FIG. 7, a wire 54 (a first wire) is provided on the rear surface (a surface opposed to the second cabinet Cb) of the LED board 51 (an alternate long and two short dashes line in FIG. 7). The wire 54 is formed to electrically connect lands formed on the LED board 51 and has a function of supplying electric power to the LEDs 52. Wires 54 are formed by, for example, being pattern-printed on the LED board 51. In FIG. 7, only a part of the wire 54 is shown.

The circuit board 80 is arranged on the bottom surface 30 of the second cabinet Cb. Examples of the circuit board 80 include a control unit (a power supply board) for supplying driving power to the LED 52 and performing driving control of the LED 52 and a vide control board for controlling a video in the television receiver TV. In this embodiment, the circuit board 80 is arranged on the bottom surface 30 and the board supporting section 42 is caused to support the LED board 51 (the light source) to make it possible to arrange the circuit board 80 and the LED board 51 along the Z axis direction and arrange the LEDs 52 over substantially the entire surface of the bottom surface 30.

A sheets holding section 33 for placing the reflection sheet 60 and the optical sheet 20 is formed at the top portion of the wall section 31. A projection 35 projecting to the first cabinet Ca side is formed on a placing surface of the sheets holding section 33. The sheets holding section 33 holds the optical sheet 20 between the sheets holding section 33 and the piece for holding 14 of the first cabinet Ca. The projection 35 regulates the movement of the optical sheet 20 in a surface direction on the inner side of the projection 35. As explained above, the projection 35 is housed in the projection housing section 18 arranged on the rear side (the outer side) of the claw section 13 of the first cabinet Ca. The projection 35 urges the claw section 13 to the liquid crystal panel 11 side (the inner side) from the rear side (the outer side).

The reflection sheet 60 is a member for reflecting light emitted from the LED 52 and is made of, for example, synthetic resin. The surface of the reflection sheet 60 is colored in white excellent in light reflectivity. The reflection sheet 60 is laid along the inner surface of the second cabinet Cb to cover substantially the entire region of the inner surface. The reflection sheet 60 includes a bottom section 60A and an inclined section 60B extending from the bottom section 60A. The inclined section 60B inclines to be oriented to the front side at a predetermined angle with respect to the bottom surface 30. It is possible to orient light, which is reflected by the inclined section 60B, to the inner side (the center side of the liquid crystal display device 10). The peripheral edge end (a place extending to the outer side from the inclined section 60B) of the reflection sheet 60 is placed on the sheets holding section 33.

The bottom section 60A of the reflection sheet 60 is supported by the surfaces on the front sides of the LED boards 51. The bottom section 60A is arranged to extend over the LED boards 51 in the Y axis direction. In the bottom section 60A of the reflection sheet 60, LED through-holes 60F, through which the LEDs 52 can pierce, are respectively formed in places corresponding to the LEDs 52. Consequently, it is possible to arrange the reflection sheet 60 without causing interference of the LEDs and the reflection sheet 60.

All the heights in the Z axis direction of the board supporting sections 42 are set to the same height. All the thicknesses of the LED boards 51 are set to the same thickness. Therefore, the reflection sheet 60 is supported by the LED boards 51, whereby the surface of the reflection sheet 60 is arranged along plane directions (the X axis and Y axis directions, i.e., a surface parallel to a light emitting surface of the backlight device 12).

The holding member 70 is attached to the board supporting section 42. The holding member 70 has a function of holding both of the LED board 51 and the reflection sheet 60 between the holding member 70 and the board supporting section 42. Plural (in this embodiment, six) holding members 70 are arrayed in the X axis direction and configured to respectively hold several places in the longitudinal direction of the LED board 51.

Figure 4:
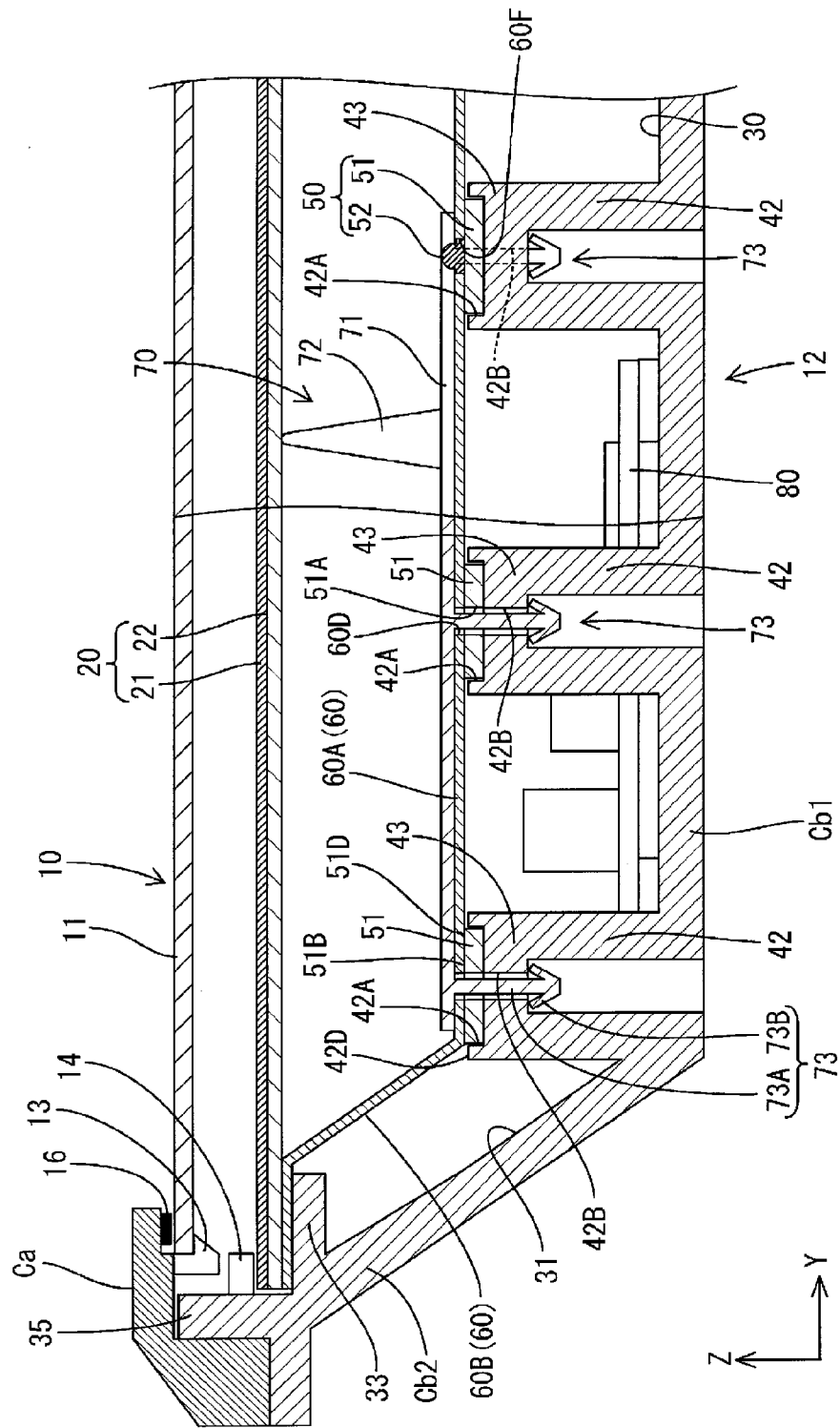
FIG. 4 is an enlarged view showing a portion around an LED in enlargement in FIG. 3.

As shown in FIGS. 2 and 4, the holding member 70 is made of, for example, synthetic resin (polycarbonate, etc.) and includes a plate section 71 in contact with the front side of the reflection sheet 60, a support pin 72 that supports the optical sheet 20, and a projection piece 73 projecting to the board supporting section 42 side from the plate section 71 and used to attach the holding member 70 to the board supporting section 42.

As shown in FIG. 2, the plate section 71 is formed in a plate shape extending in the Y axis direction in plan view. The length in the Y axis direction of the plate section 71 is set to length extending over three rows of the LED boards 51. Specifically, the length in the Y axis direction of the plate section 71 is set to a dimension same as (or larger than) a dimension obtained by adding up a triple dimension of width YA of the LED board 51 and a double dimension of a space YB between the LED boards 51 in the Y axis direction. In other words, the three rows of the LED boards 51 are held by one plate section 71.

In this embodiment, in the Y axis direction, nine rows of the LED boards 51 are arranged. Therefore, in the Y axis direction, the holding members 70 are arranged in three rows. The holding member 70 in the second row (denoted by a sign 70A) is arranged to be shifted in the X axis direction with respect to the first and third holding members 70. Consequently, the reflection sheet 60 can be pressed by the plural plate sections 71 in a better balanced state. The entire surface of the holding member 70 is set to a color excellent in light reflectivity (e.g., white).

As shown in FIG. 4, the support pin 72 is formed in a substantially conical shape projecting to the optical sheet 20 side from the plate section 71. The distal end of the support pin 72 projects to be in contact with (close to) the surface on the rear side in the diffuser 22. Consequently, when the diffuser 22 bends, the support pin 72 has a function of supporting the diffuser 22 from the rear side to suppress the bend of the diffuser 22. For example, one support pin 72 is formed in one place with respect to one holding member 70 (or may be formed in plural places). In the Y axis direction, the support pin 72 is arranged in a substantially center position between the projection pieces 73 adjacent to each other.

The projection piece 73 is inserted through a locking section insert through-hole 42B formed to pierce through the bottom wall 43 of the board supporting section 42 in the Z axis direction. In the plate section 71, the projection piece 73 is arranged in plural places (in this embodiment, three places) along the Y axis direction. The projection piece 73 includes a base 73A formed in a columnar shape having an external shape smaller than the locking section insert through-hole 42B in plan view and a distal end portion 73B provided at the distal end of the base 73A. The distal end portion 73B pierces through the locking section insert through-hole 42B and is locked to the bottom wall 43 of the board supporting section 42 from the rear side.

Specifically, the distal end portion 73B is formed in a substantial V shape, the width of which in the Y axis direction is set to be narrower toward the rear side. The width in the Y axis direction of the distal end portion 73B is set larger than an inner diameter YF of the locking section insert through-hole 42B in width YE of the end on the front side and set smaller than the inner diameter YF of the locking section insert through-hole 42B in width YD of the end on the rear side. The distal end portion 73B is elastically deformable in the Y axis direction. When the distal end portion 73B is elastically deformed, the width YE in the Y axis direction of the end on the front side becomes smaller than the inner diameter YF of the locking section insert through-hole 42B.

Figure 5:
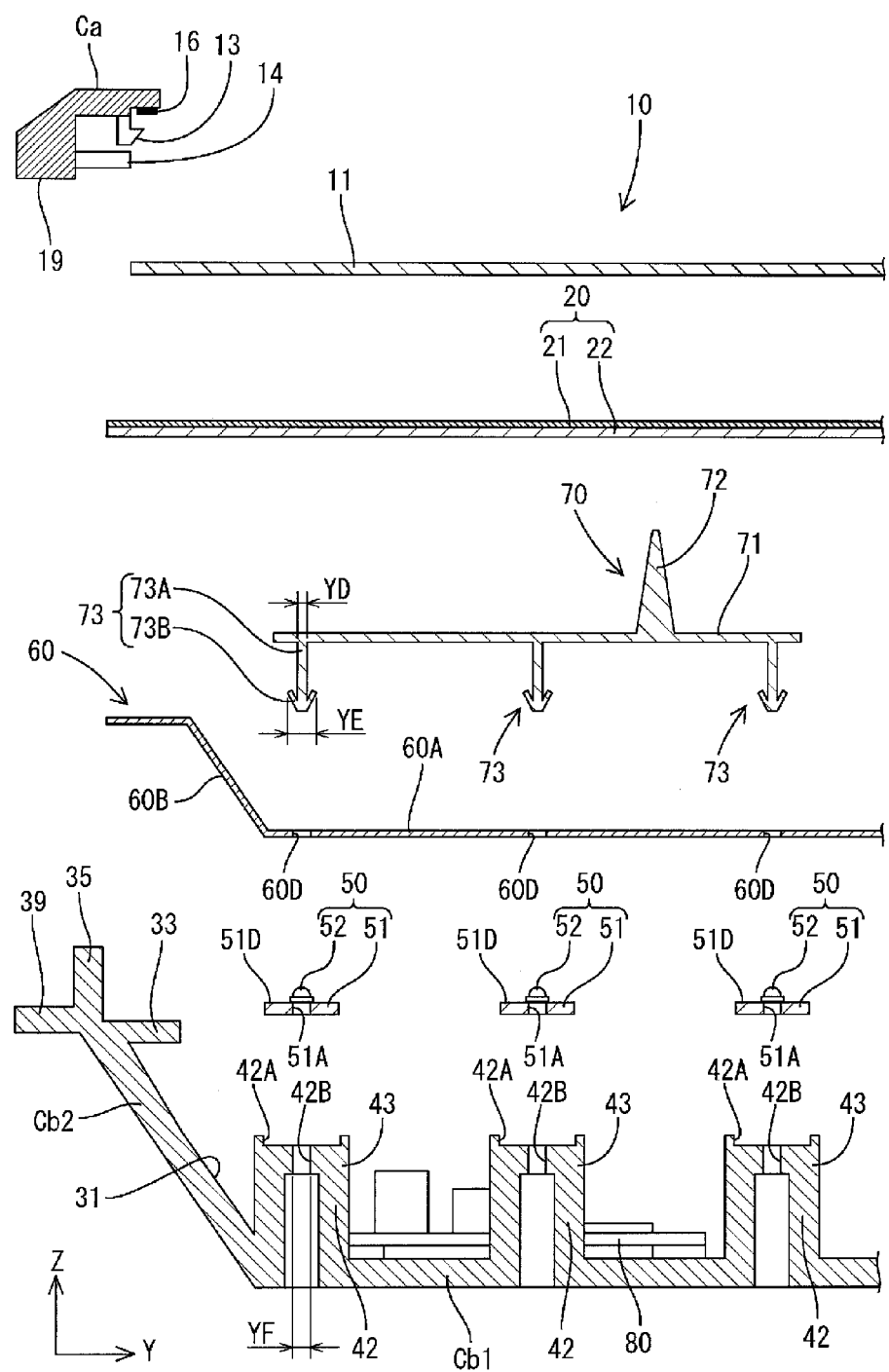
FIG. 5 is a disassembled view showing components in a disassembled state in FIG. 3.

As shown in FIGS. 4 and 5, in the reflection sheet 60, an insert through-hole 60D is formed in a place corresponding to the projection piece 73. In the LED board 51, an insert through-hole 51A is formed in a place corresponding to the projection piece 73. The insert through-holes 60D and 51A are set to a diameter substantially the same as that of the locking section insert through-hole 42B. The projection piece 73 can be locked to the locking section insert through-hole 42B while piercing through the insert through-holes 60D and 51A.

A method of assembling the liquid crystal display device 10 according to this embodiment is explained. In this embodiment, after the first cabinet Ca and the second cabinet Cb are separately assembled, the first cabinet Ca and the second cabinet Cb are assembled together to assemble the liquid crystal display device 10.

The assembly of the first cabinet Ca is performed as explained below. First, the liquid crystal panel 11 is attached to the first cabinet Ca. In other words, the liquid crystal panel 11, which is separately manufactured, is attached to the claw section 13 of the first cabinet Ca. However, as shown in FIG. 6, the liquid crystal panel 11 is pushed against the slope 13a of the claw section 13 (in an arrow direction) from the rear side of the first cabinet Ca to elastically deform the claw section 13 in the widening direction (the outer side) and house the liquid crystal panel 11 between the locking surface 13b and the elastic member 16. When the liquid crystal panel 11 is housed between the locking surface 13b and the elastic member 16, the claw section 13 elastically returns and the liquid crystal panel 11 is prevented or suppressed from dropping from between the locking surface 13b and the elastic member 16. The assembly of the first cabinet Ca is completed.

On the other hand, the assembly of the second cabinet Cb is performed as explained below. First, the circuit board 80 is attached to the bottom surface 30 of the second cabinet Cb. Subsequently, each of the LED boards 51 (the light source units 50) are respectively fit in the board attachment grooves 42A of the board supporting sections 42. The peripheral edge of the reflection sheet 60 is placed on the sheets holding section 33 and the bottom section 60A of the reflection sheet 60 is placed on surfaces 51D of the LED boards 51. Consequently, the bottom section 60A of the reflection sheet 60 is supported by the plural LED boards 51.

Next, the holding member 70 is attached to the board supporting section 42. Specifically, the projection piece 73 of the holding member 70 is inserted through the insert through-hole 60D of the reflection sheet 60, the insert through-hole 51A of the LED board 51, and the locking section insert through-hole 42B of the board supporting section 42 from the front side in this order. In this process for inserting the projection piece 73, when the distal end portion 73B of the projection piece 73 is inserted through the locking section insert through-hole 42B, the projection piece 73 is elastically deformed to reduce the width YE in the Y axis direction. When the distal end portion 73B passes through the locking section insert through-hole 42B, the projection piece 73 elastically returns. Consequently, the distal end portion 73B is locked to the hole edge of the locking section insert through-hole 42B from the rear side (i.e., the distal end portion 73B is locked to the second cabinet Cb from the opposite side of the LED board 51). In this way, the holding member 70 can be fixed to the second cabinet Cb simply by inserting the projection piece 73 through the locking section insert through-hole 42B in this way. Therefore, workability is high.

As explained above, when the holding member 70 is fixed to the second cabinet Cb, both of the reflection sheet 60 and the LED board 51 are held between the plate section 71 of the holding member 70 and the board supporting section 42. Since the reflection sheet 60 and the LED board 51 are pierced through by the projection piece 73, it is possible to more surely align the reflection sheet 60 and the LED board 51 in plane directions thereof (the X axis and Y axis directions).

Subsequently, the optical sheet 20 is placed. Specifically, the optical sheet 20 is placed in a region surrounded by projections 35, i.e., on the sheets holding section 33. According to the procedure explained above, the assembly of the second cabinet Cb is completed.

In the procedure explained above, the first cabinet Ca and the second cabinet Cb assembled in the procedure explained above are assembled with attachment surfaces 19 and 39 thereof (shown in FIG. 5) opposed to each other and such that the projection 35 is housed in the projection housing section 18 of the first cabinet Ca. According to the assembling, the optical sheet 20 is held between the pieces for holding 14 of the first cabinet Ca and the sheets holding section 33 of the second cabinet Cb. The liquid crystal display device 10 is completed according to such engagement of the first cabinet Ca and the second cabinet Cb. The liquid crystal display device 10 is supported by the stand S (see FIG. 1), whereby the television receiver TV is provided.

As explained above, with the television receiver TV according to this embodiment, in the liquid crystal display device 10 thereof, the liquid crystal panel 11 is attached to the first cabinet Ca and the LEDs 52 are attached to the second cabinet Cb. Therefore, it is possible to realize a display function of the liquid crystal panel 11, which makes use of the light from the LEDs 52, by engaging the cabinets Ca and Cb.

The first cabinet Ca and the second cabinet Cb configure the outer case that forms the exterior of the liquid crystal display device 10. Therefore, it is possible to provide the liquid crystal display device 10 as a final product such as the television receiver TV simply by engaging the first cabinet Ca and the second cabinet Cb. In particular, in this embodiment, since an attachment member such as a bezel is disused, a reduction in material cost is realized. The number of assembly processes is reduced compared with, for example, the number of assembly processes for assembling a display panel and a backlight device and then housing the display panel and the backlight device in a separate cabinet to provide a final product such as a television receiver as in the past. In this regard, a cost reduction can also be realized.

Alignment of the display panel 11 and the backlight device 12 is realized by assembling of the first cabinet Ca and the second cabinet Cb. Therefore, workability of the alignment is improved. It is unnecessary to secure a region for alignment in the display panel 11. Therefore, it is possible to easily perform the alignment without involving a situation in which an effective display region of the display panel 11 is reduced.

The LED board 51 is caused to support the reflection sheet 60. Since the second cabinet Cb is a member for attaching components such as the circuit board 80, irregularities (e.g., holes for component attachment and wall sections for component alignment) tend to be formed. If the reflection sheet 60 is attached to a surface on which the irregularities are formed, in some cases, a bend and a lift occurs in the reflection sheet 60 and luminance unevenness due to the bend and the lift occurs. In the LED board 51 formed in a plate shape, irregularities on the surface are hardly formed and occurrence of a bend and a lift that occur when the reflection sheet 60 is supported can be suppressed. It is unnecessary to provide an exclusive member for supporting the reflection sheet 60. In this regard, it is also possible to realize a cost reduction.

The liquid crystal display device 10 includes the holding member 70 that can hold both of the reflection sheet 60 and the LED board 51 between the holding member 70 and the second cabinet Cb. With such a configuration, it is possible to hold and fix both of the reflection sheet 60 and the LED board 51 between the holding member 70 and the second cabinet Cb. Consequently, it is possible to reduce the number of components compared with a configuration including fixing means respectively for fixing the reflection sheet 60 and the LED board 51. Therefore, it is possible to reduce cost of components and a work time related to attachment of the components.

The liquid crystal display device 10 includes the optical sheet 20 that diffuses the light from the LED 52 and the support pin 72 that projects to the optical sheet 20 side from the holding member 70 and can support the optical sheet 20. Since the light from the LED 52 is diffused by the optical sheet 20, it is possible to suppress luminance unevenness. Since the optical sheet 20 is supported by the support pin 72, it is possible to suppress a bend of the optical sheet 20 and suppress luminance unevenness due to the bend of the optical sheet 20.

The liquid crystal display device 10 includes the circuit board 80 arranged on the bottom surface 30 of the second cabinet Cb and the board supporting section 42 that can support the LED board 51. When the circuit board 80 is arranged on the bottom surface 30 of the second cabinet Cb, it is necessary to arrange the LED 52 avoiding the circuit board 80. Therefore, in this embodiment, the board supporting section 42 is caused to support the LED board 51 to arrange the circuit board 80 and the LED board 51 side by side in the Z axis direction. In the case of the configuration including the board supporting section 42 as explained above, irregularities occur on the bottom surface 30. Therefore, if the reflection sheet 60 is attached to the bottom surface 30, a bend and a lift of the reflection sheet 60 are concerned. However, in this embodiment, since the LED board 51 formed in a plate shape is caused to support the reflection sheet 60, although the configuration includes the board supporting section 42, it is possible to arrange the circuit board 80 on the second cabinet Cb on which a bend and a lift of the reflection sheet 60 are suppressed.

The holding member 70 includes the projection piece 73 projecting to the second cabinet Cb side. The projection piece 73 is fixed to the second cabinet Cb (the board supporting section 42) while piercing through both of the reflection sheet 60 and the LED board 51. Since the projection piece 73 is caused to pierce through the reflection sheet 60 and the LED board 51, it is possible to more surely align the reflection sheet 60 and the LED board 51 respectively with respect to plane directions thereof.

The projection piece 73 pierces through the second cabinet Cb and is locked to the second cabinet Cb from the opposite side (the rear side) of the LED board 51 side (the front side). With such a configuration, an exclusive attachment component (a screw, etc.) for attaching the projection piece 73 (and the holding member 70) to the second cabinet Cb is unnecessary and it is possible to reduce cost.

In the LED board 51, the wire 54 for supplying electric power to the LED 52 is arranged on the surface opposed to the second cabinet Cb (the surface on the rear side of the LED board 51). With such a configuration, since the second cabinet Cb and the wire 54 are arranged to be opposed to each other, it is possible to effectively radiate, from the wire 54 to the second cabinet Cb side, heat generated during the power supply to the LED 52. In particular, in this embodiment, since the second cabinet Cb forms the outer case of the liquid crystal display device 10, compared with a configuration including an intermediate attachment member such as a chassis, it is possible to effectively perform heat radiation to the outside of the device via the second cabinet Cb.

Second Embodiment

A second embodiment of the present invention is explained with reference to FIGS. 8 to 11. In a liquid crystal display device 110 (or a backlight device 112) according to the second embodiment, the shape of an LED board and the configuration of a holding member are different from those in the embodiment explained above. In the second embodiment, components having names same as those in the first embodiment are denoted by the same reference numerals and signs and redundant explanation is omitted concerning structures, actions, and effects.

Figure 8:
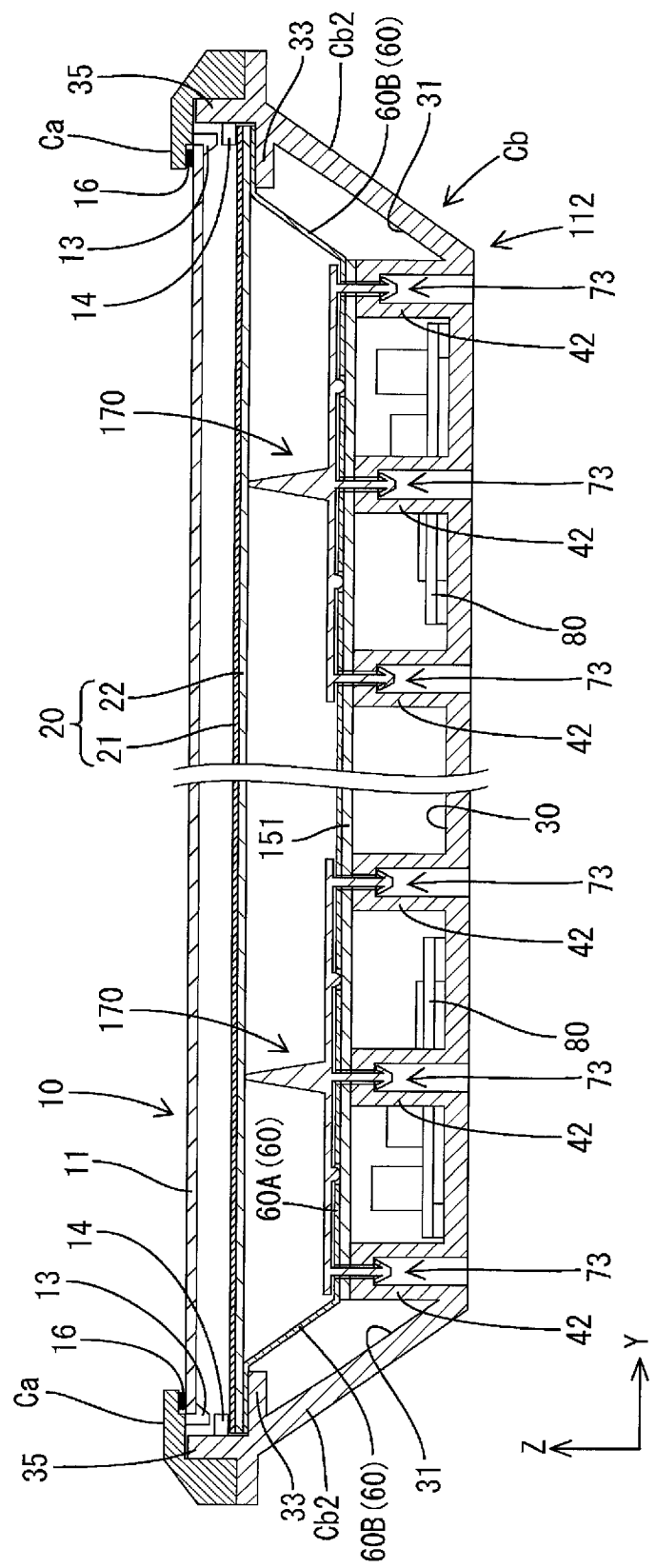
FIG. 8 is a sectional schematic view showing a state in which a liquid crystal display device according to a second embodiment taken along a short side direction.

In the liquid crystal display device 10 according to the first embodiment, the configuration including the plural LED boards 51 is adopted. However, in this embodiment, a configuration including only one LED board 151 is adopted. The LED board 151 is set to a size arranged over substantially the entire surface (entire region) of the bottom surface 30 of the second cabinet Cb in plan view and is supported over the board supporting sections 42 (FIG. 8). The board attachment groove 42A formed in the board supporting section 42 in the first embodiment is disused. In the LED board 151, the plural LEDs 52 are two-dimensionally arranged in plane directions (the X axis and Y axis directions).

Since the LED board 151 having the size arranged over substantially the entire surface of the bottom surface 30 explained above is caused to support the bottom section 60A of the reflection sheet 60, a portion of the reflection sheet 60 that supports the bottom section 60A increases. Therefore, it is possible to more effectively suppress a bend of the reflection sheet 60.

Figure 9:
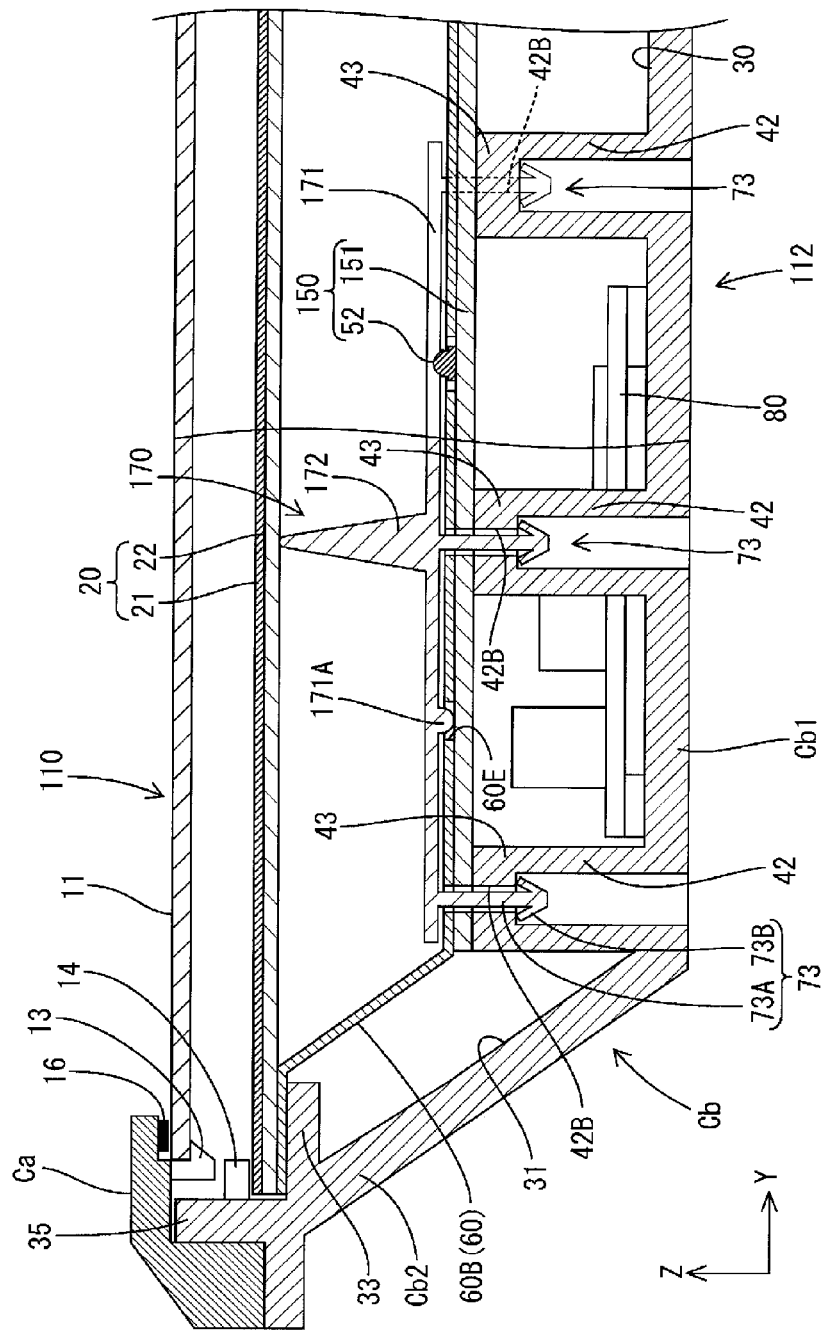
FIG. 9 is an enlarged view showing a portion around an LED in enlargement in FIG. 8.
Figure 10:
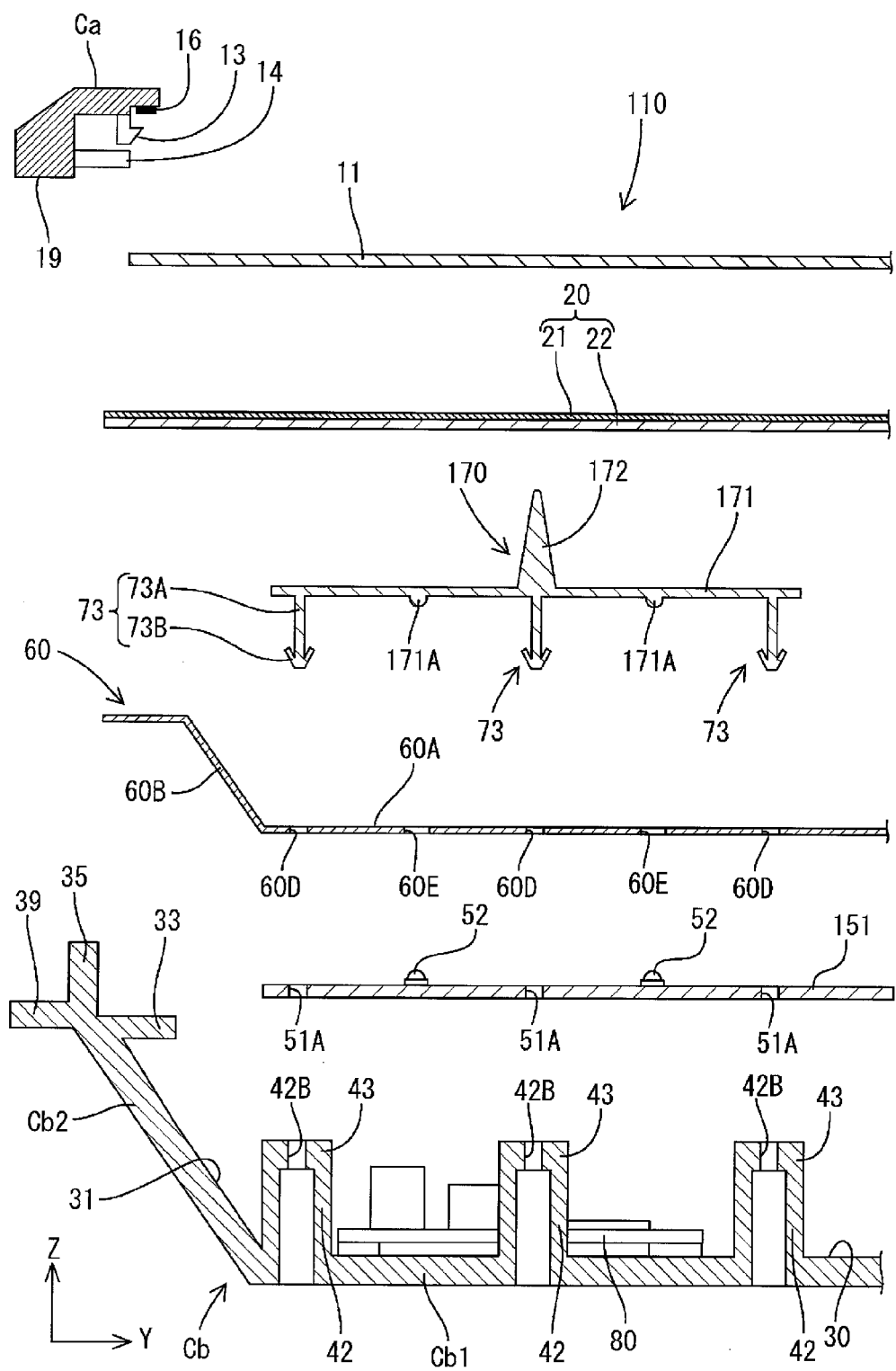
FIG. 10 is a disassembled view showing components in a disassembled state in FIG. 8.

As shown in FIGS. 9 and 10, in a holding member 170 according to this embodiment, a projection 171A is formed in a plate section 171 toward the rear side. The projection 171A is formed in a substantially semispherical shape and is formed in plural places (in this embodiment, two places) along the Y axis direction. The LED board 151 is retained by pressing the LED board 151 from the front side with the projection 171A. An insert through-hole 60E is formed in a place corresponding to the projection 171A in the bottom section 60A of the reflection sheet 60. The projection 171A can be inserted through the insert through-hole 60E (see FIG. 11). In the sectional view of FIG. 9, on the left side and the right side in the figure, cross sections cut in different places are respectively shown.

As explained above, since the projection 171A is provided in the holding member 170, the reflection sheet 60 is not pressed (held) and only the LED board 151 is pressed. For example, when the reflection sheet 60 thermally expands or thermally contracts, it is likely that the reflection sheet 60 stretches or shrinks. When the reflection sheet 60 is held, the stretching or shrinking is forcibly suppressed. Therefore, it is likely that a crease or a bend occurs. In this regard, in the configuration according to this embodiment, the reflection sheet 60 is not held and the stretching or shrinking that could occur during the thermal expansion or the thermal contraction is allowed. Therefore, the occurrence of a crease or a bend can be suppressed. As a result, unevenness less easily occurs in light reflected by the reflection sheet 60. A support pin 172 is arranged coaxially with the projection piece 73 (the projection piece 73 in the center among the three projection pieces 73 arranged side by side) in the Y axis direction.

Other Embodiments

The present invention is not limited to the embodiments explained according to the above description and the drawings. For example, embodiments explained below are also included in the technical scope of the present invention.

(1) In the first embodiment, the configuration in which the LED board 51 is caused to support the bottom section 60A of the reflection sheet 60 is adopted. However, the present invention is not limited to this. For example, a configuration in which the surface 42D of the board supporting section 42 and the surface 51D of the LED board 51 are set to flush with each other and the bottom section 60A is supported to extend over both the surface 42D and the surface 51D may be adopted. With such a configuration, compared with the configuration in which the bottom section 60A is supported only by the LED board 51, supported places increase. As a result, it is possible to more surely suppress a bend of the reflection sheet 60.

(2) In the second embodiment, the LED board 151 is set to the size arrange substantially the entire surface of the bottom surface 30 of the second cabinet Cb in plan view. However, the present invention is not limited to this configuration. The shape, the size, the number, and the like of LED boards can be changed as appropriate.

(3) In the embodiments, the configuration in which the wire 54 is arranged on the surface on the rear side of the LED board 51 is adopted. However, a wire (a second wire) may be arranged on the surface of the LED board 51 opposed to the reflection sheet. With such a configuration, it is possible to perform heat radiation from the surface of the LED board 51 opposed to the reflection sheet. Wires may be respectively arranged on both the surfaces (the surface opposed to the second cabinet and the surface opposed to the reflection sheet) of the LED board 51. With such a configuration, it is possible to more effectively radiate head compared with the configuration in which the wire is arranged only on one surface.

(4) In the aforementioned first embodiment, the configuration in which the plural (three) coupled light source units 50 are arranged in the X axis direction. However, the number of coupled light source units 50A and 50B and a combination of the light source units 50A and 50B can be changed as appropriate. A configuration in which only one LED board 51 is arranged along the X axis direction may be adopted.

(5) In the aforementioned embodiments, the board supporting section 42 is formed on the bottom surface 30 of the second cabinet Cb. However, a configuration not including the board supporting section 42 may be adopted.

(6) In the aforementioned embodiments, the control unit and the video control board are explained as the examples of the circuit board 80. However, the circuit board 80 may be a circuit board other than the control unit and the video control board and may be, for example, a circuit board such as a tuner.

(7) In the aforementioned embodiments, the LED 52 including the blue-light emitting LED chip and the fluorescent material is explained as the example. However, the present invention is not limited to this. The LED 52 may have a configuration including, for example, an ultra-violet ray emitting LED chip and a fluorescent material. The LED 52 may have a configuration including three kinds of LED chips that emit lights of single colors of R (red), G (green), and B (blue). The LED 52 may have a configuration in which the three kinds of LED chips that emit lights of single colors of R (red), G (green), and B (blue) are combined.

(8) The configuration of the optical sheet 20 may be a configuration other than the configuration explained in the embodiments and can be changed as appropriate. For example, the number of diffusers 22, the number and types of sheets 21, and the like can be changed as appropriate.

(9) In the aforementioned embodiments, the TFT is used as the switching element of the liquid crystal display device. However, the present invention can also be applied to a liquid crystal display device including a switching element other than the TFT (e.g., a thin film diode (TFD)). Besides the liquid crystal display device that performs color display, the present invention can also be applied to a liquid crystal display device that performs monochrome display.

(10) In the aforementioned embodiments, the liquid crystal display device including the liquid crystal panel as the display element is explained as the example. However, the present invention can also be applied to display devices including display elements of other types.

(11) In the aforementioned embodiments, the television receiver including the tuner is explained as the example. However, the present invention can also be applied to a display device not including a tuner.

(12) In the aforementioned embodiments, as the locking structure for the projection piece 73, the configuration in which, after the projection piece 73 is inserted through the locking section insert through-hole 42B, the distal end portion 73B of the projection piece 73 elastically deformed, whereby the projection piece 73 is locked from the rear side of the second cabinet Cb is adopted. However, the present invention is not limited to this. For example, a slide type may be adopted as the locking structure. The fixing structure of the slide type refers to a locking structure in which a projection piece is formed in a hook shape and the projection piece is inserted through the locking section insert through-hole 42B of the board supporting section 42 and then the holding member 70 is slid along the bottom wall 43 to lock a hook-like portion of the projection piece to the edge of the locking section insert through-hole 42B.

(13) Besides the aforementioned embodiments, the number and places of the holding members 70 set on the second cabinet Cb can be changed as appropriate.

(14) Besides the aforementioned embodiments, the number and places of the projection pieces 73 formed in the holding member 70 can be changed as appropriate.

(15) In the aforementioned embodiments, the configuration in which five or six LEDs 52 are mounted on the LED board 51 is explained as the example. However, the number of mounted LEDs 52 can be changed as appropriate. An arrangement interval of the LEDs 52 can be changed as appropriate.

(16) In the aforementioned second embodiment, the projection 171A of the holding member 170 is formed in the substantially semispherical shape. However, the shape of the projection 171A may be a shape other than the substantially semispherical shape. For example, the projection 171A may be formed in a columnar shape set to be reduced in diameter toward a projecting end.

The invention claimed is:
1. A display device comprising:
a light source;
a board on which the light source is mounted;
a display panel configured to provide display using light from the light source;
a first cabinet to which the display panel is attached;
a second cabinet to which the board is attached;
a reflection sheet configured to reflect the light from the light source; and
a power supply board arranged on a bottom surface of the second cabinet and arranged to supply electric power to the light source, wherein the second cabinet includes a board supporting section that is defined by projecting a portion of the bottom surface of the second cabinet toward the reflection sheet and supports the board, wherein
the first cabinet and the second cabinet are engaged with each other, and provided as an outer case that defines an exterior of the display device, and
the reflection sheet is arranged on an inner surface of the second cabinet in a state in which the reflection sheet is supported by the board.

2. The display device according to claim 1, further comprising a holding member that holds both of the reflection sheet and the board between the holding member and the second cabinet.

3. The display device according to claim 2, further comprising an optical sheet arranged between the first cabinet and the second cabinet and configured to diffuse the light from the light source, wherein the holding member includes a sheet supporting section that projects toward the optical sheet and supports the optical sheet.

4. The display device according to claim 1, wherein the board is arranged over at least an entire region of a bottom surface of the second cabinet in plan view.

5. The display device according to claim 2, wherein the holding member includes a projection piece projecting toward the second cabinet and is fixed to the second cabinet while piercing through both of the reflection sheet and the board.

6. The display device according to claim 5, wherein the projection piece pierces through the second cabinet, the reflection sheet, and the board, and is locked to the second cabinet from a side away from the board.

7. The display device according to claim 1, wherein the board includes a first wire for supplying electric power to the light source on a surface opposite the second cabinet.

8. The display device according to claim 1, wherein the board includes a second wire for supplying electric power to the light source on a surface opposite the reflection sheet.

9. The display device according to claim 1, wherein the display panel is a liquid crystal panel including liquid crystals.

10. A television receiver comprising the display device according to claim 1.

11. A display device comprising:
a light source;
a board on which the light source is mounted;
a display panel configured to provide display using light from the light source;
a first cabinet to which the display panel is attached;
a second cabinet to which the board is attached;
a reflection sheet configured to reflect the light from the light source; and
a holding member that is arranged to hold both of the reflection sheet and the board between the holding member and the second cabinet; wherein
the first cabinet and the second cabinet are engaged with each other, and provided as an outer case that defines an exterior of the display device;
the reflection sheet is arranged on an inner surface of the second cabinet in a state in which the reflection sheet is supported by the board; and
the holding member includes a projection piece projecting toward the second cabinet and is fixed to the second cabinet while piercing through both of the reflection sheet and the board.

12. The display device according to claim 11, further comprising an optical sheet arranged between the first cabinet and the second cabinet and arranged to diffuse the light from the light source, wherein the holding member includes a sheet supporting section that projects toward the optical sheet and supports the optical sheet.

13. The display device according to claim 11, further comprising a power supply board arranged on a bottom surface of the second cabinet and arranged to supply electric power to the light source, wherein the second cabinet includes a board supporting section that is defined by projecting a portion of the bottom surface of the second cabinet toward the reflection sheet and supports the board.

14. The display device according to claim 11, wherein the board is arranged over at least an entire region of a bottom surface of the second cabinet in plan view.

15. The display device according to claim 11, wherein the projection piece pierces through the second cabinet, the reflection sheet, and the board, and is locked to the second cabinet from a side away from the board.

16. The display device according to claim 11, wherein the board includes a first wire arranged to supply electric power to the light source on a surface opposite the second cabinet.

17. The display device according to claim 11, wherein the board includes a second wire arranged to supply electric power to the light source on a surface opposite the reflection sheet.

18. The display device according to claim 11, wherein the display panel is a liquid crystal panel including liquid crystals.

19. A television receiver comprising the display device according to claim 11.

* * * * *